United States Patent
Linville et al.

(10) Patent No.: US 7,444,397 B2
(45) Date of Patent: Oct. 28, 2008

(54) METHOD OF EXECUTING TEST SCRIPTS AGAINST MULTIPLE SYSTEMS

(75) Inventors: Ronald L. Linville, Cary, NC (US); Robert K. Quinn, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 11/018,439

(22) Filed: Dec. 21, 2004

(65) Prior Publication Data

US 2006/0136579 A1    Jun. 22, 2006

(51) Int. Cl.
G06F 15/173 (2006.01)
G06F 15/167 (2006.01)
G06F 15/16 (2006.01)

(52) U.S. Cl. .................. 709/223; 709/213; 709/208

(58) Field of Classification Search .................. 709/203, 709/213, 223; 702/182–184; 707/101, 102; 717/124, 126
See application file for complete search history.

(56) References Cited

U.S. PATENT DOCUMENTS

| | | | |
|---|---|---|---|
| 5,974,572 A * | 10/1999 | Weinberg et al. | 714/47 |
| 6,151,599 A | 11/2000 | Shrader et al. | |
| 6,665,634 B2 * | 12/2003 | Taft et al. | 702/186 |
| 6,694,509 B1 | 2/2004 | Stoval et al. | |
| 6,934,934 B1 * | 8/2005 | Osborne et al. | 717/126 |
| 6,993,748 B2 * | 1/2006 | Schaefer | 717/124 |
| 2002/0188507 A1 | 12/2002 | Busche | |
| 2003/0055836 A1 | 3/2003 | Dubovsky | |
| 2003/0056116 A1 | 3/2003 | Bunker et al. | |
| 2003/0074423 A1 | 4/2003 | Mayberry et al. | |
| 2003/0074606 A1 | 4/2003 | Boker | |
| 2003/0084429 A1 | 5/2003 | Schaefer | |
| 2003/0120971 A1 | 6/2003 | Christie | |
| 2003/0149765 A1 | 8/2003 | Hubbard et al. | |
| 2003/0233216 A1 | 12/2003 | Ouchi | |
| 2004/0039550 A1 | 2/2004 | Myers | |

(Continued)

OTHER PUBLICATIONS

Mercury Interactive Corporation, Certification Test Director, Sep. 13, 2004, 2 pages, Mercury Education Services, http://www.merc-training.com/MAIN/menu/certification/testdirector.cfm.

(Continued)

Primary Examiner—Ario Etienne
Assistant Examiner—Hee Soo Kim
(74) Attorney, Agent, or Firm—Silvy Anna Murphy

(57) ABSTRACT

A method of executing a plurality of tests scripts or one or more test script sets against a plurality of systems to be tested. The method comprises providing an instance of a test script set on a server, writing an initial system value corresponding to an initial system to be tested on a web page file hosted on the server, retrieving the initial system value from the web page file and launching a URL using the initial system value retrieved to execute the test script set against the initial system to be tested. The method further includes overwriting the web page file to change the initial system value to a next system value corresponding to a next system to be tested, retrieving the next system value from the web page file and launching a next URL using the next system value retrieved to execute the test script set against the next system to be tested.

16 Claims, 7 Drawing Sheets

U.S. PATENT DOCUMENTS

2004/0199818 A1* 10/2004 Boilen et al. .................. 714/25

OTHER PUBLICATIONS

Mercury Interactive Corporation, Certification Quick TestPro, Sep. 13, 2004, 2 pages, Mercury Education Services, http://www.merc-training.com/MAIN/menu/certification/quicktestpro.cfm.

Tri-Force Consulting Services, Inc., Mercury Test Director, Jun. 29, 2004, 2 pages, Tri-Force Consulting Services, Inc., http://www.triforce-inc.com/tts_mercury.htm.

Upbin, B., "Higher Ground", Forbes Magazine, Hot Shots 200 Up & Comers, Oct. 27, 2003 issue, Forbes Inc.

* cited by examiner

FIG. 3

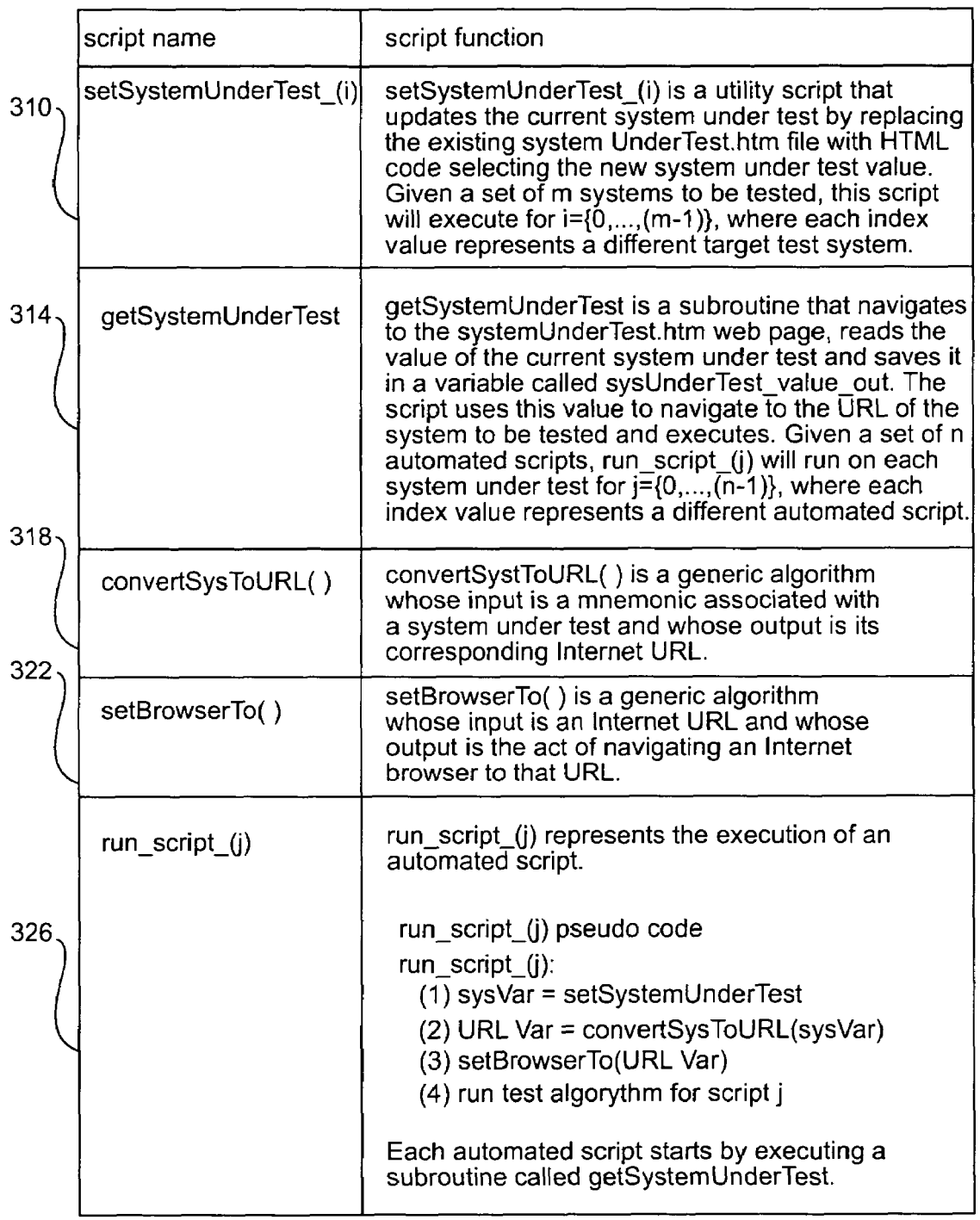

| script name | script function |
|---|---|
| setSystemUnderTest_(i) | setSystemUnderTest_(i) is a utility script that updates the current system under test by replacing the existing system UnderTest.htm file with HTML code selecting the new system under test value. Given a set of m systems to be tested, this script will execute for i={0,...,(m-1)}, where each index value represents a different target test system. |
| getSystemUnderTest | getSystemUnderTest is a subroutine that navigates to the systemUnderTest.htm web page, reads the value of the current system under test and saves it in a variable called sysUnderTest_value_out. The script uses this value to navigate to the URL of the system to be tested and executes. Given a set of n automated scripts, run_script_(j) will run on each system under test for j={0,...,(n-1)}, where each index value represents a different automated script. |
| convertSysToURL( ) | convertSystToURL( ) is a generic algorithm whose input is a mnemonic associated with a system under test and whose output is its corresponding Internet URL. |
| setBrowserTo( ) | setBrowserTo( ) is a generic algorithm whose input is an Internet URL and whose output is the act of navigating an Internet browser to that URL. |
| run_script_(j) | run_script_(j) represents the execution of an automated script.<br><br>run_script_(j) pseudo code<br>run_script_(j):<br>  (1) sysVar = setSystemUnderTest<br>  (2) URL Var = convertSysToURL(sysVar)<br>  (3) setBrowserTo(URL Var)<br>  (4) run test algorythm for script j<br><br>Each automated script starts by executing a subroutine called getSystemUnderTest. |

```
Source code example for setSystemUnderTest ( ) utility script:
'= = = PREPARE HTML FOR WRITING = = =
Data Table ("sysUnderTest_path",dtGlobalSheet)
path = Data Table ("sysUnderTest_path,dtGlobalSheet)="E:\systemUnderTest.htm"
Set fso = CreateObject("Scripting.FileSystemObject")
Set myfile = fso.OpenTextFile(path,8,True)
Environment("myfile") = myfile
'= = = WRITE TO HTML FILE → SETTING SYSTEM UNDER TEST TO SYSTEM 1 = = =
Environment("myfile").WriteLine "<html>
<head>
<title>System Under Test</title>
</head>
<body>
<p>System Under Test:</p>
<p><select size="1"name="sysUnderTest">
    <option selected>System1</option>
    <option>System2</option>
    <option>System3</option>
    <option>System4</option>
  </select></p>
 </form>
 </body>
 </html>"
'= = CLOSE HTML FILE = = =
Environment("myfile").Close
```

Source code example for getSystemUnderTest ( ) subroutine:

InvokeApplication "C:\Program Files\Internet Explorer\EXPLORE.EXE"
Browser("System Under").Navigate"E:\SystemUnderTest.htm"
Browser("System Under").Page("System Under").WebList("sysUnderTest").Output CheckPoint("sysUnderTest")
= = = VALUE OF SYSTEM TO BE TESTED SAVED IN VARIABLE: "sysUnderTest_value_out"
= = = THIS VALUE IS USED TO NAVIGATE TO THE CORRECT URL AND RUN THE AUTOMATED SCRIPT
return sysUnderTest_value_out

700

US 7,444,397 B2

METHOD OF EXECUTING TEST SCRIPTS AGAINST MULTIPLE SYSTEMS

FIELD OF THE INVENTION

The present invention relates to a method of executing one or more test scripts or one or more test script sets against a plurality of computer systems to be tested.

BACKGROUND OF THE INVENTION

System integration testing often involves the use of regression testing. Regression testing is the process of testing changes to computer programs to make sure that the older programming still works with the new changes. In large organizations, regression testing is a part of the software development process and is carried out by software professionals or testing specialists. These software professionals develop test sets or test script sets that will test new units of code. All or a subset of the established test sets or test script sets may be reused. When a new version of software is installed, the old test script sets are run against the new version to make sure that all the old capabilities of the software still work. Often organizations need to test the implementation of a software program across multiple computer systems or geographies. Thus, there is a need for a system and method of executing test scripts across multiple computer systems or geographies in a more efficient and economic manner by an organization.

SUMMARY OF THE INVENTION

In a first aspect of the invention, there is provided a method of executing a set of automated test scripts against a plurality of systems. The method comprises the steps of providing an instance of the set of automated test scripts on a server, writing to a system-under-test web page file hosted on the server an initial system-under-test value corresponding to an initial system to be tested, retrieving the initial system-under-test value from the system-under-test web page file and launching an initial URL using the initial system-under-test value retrieved to execute the set of automated test scripts against the initial system to be tested. The writing step preferably comprises creating a set-system-under-test script for each of the plurality of systems and executing an initial one of the set-system-under-test script created to generate the system-under-test web page file having the initial system-under-test value. The retrieving step preferably comprises creating a get-system-under-test script for navigating to the system-under-test web page file on the server, adding the get-system script to the beginning of each one of a plurality of test scripts within the set of automated test scripts and executing the get-system-under-test script to retrieve the initial system-under-test value from the system-under-test web page file. The launching step preferably comprises converting the initial system-under-test value to the initial URL and navigating a browser to the initial URL to execute the set of automated test scripts. The method preferably includes the steps of overwriting the system-under-test web page file to change the initial system-under-test value to a next system-under-test value corresponding to a next system to be tested, retrieving the next system-under-test value from the system-under-test web page file and launching a next URL using the next system-under-test value to execute the set of automated test scripts against the next system to be tested. The overwriting step preferably comprises executing another one of the set-system-under-test script created to change the initial system-under-test value to the next system-under-test value on the web page file. The method preferably comprises the steps of repeating the overwriting, retrieving and launching steps until the set of automated test scripts have been executed against each of the plurality of systems to be tested. In a preferred embodiment, the set of automated test scripts are created using a test script execution engine, whereas, the set of automated test scripts are executed, preferably, using a test script execution manager. Furthermore, in a preferred embodiment, the web page file is a static web page file.

In another embodiment of the invention, there is provided a method of executing multiple sets of automated test scripts against a plurality of systems to be tested. The method comprises the steps of providing a test script execution manager for executing the multiple sets of automated test scripts, and providing an instance of the multiple sets of automated test scripts, preferably, on a server. The method preferably comprises appending a get-system script to the beginning of each individual test script within each of the multiple sets of automated test scripts for retrieving a desired system value corresponding to a desired one of the plurality of systems to be tested, selecting a desired one of a plurality of set-system scripts corresponding to the desired one of the plurality of systems to be tested, and selecting one or more test script sets from the multiple sets of automated test scripts to be executed against the desired one of the plurality of systems. The appending step preferably comprises creating a get-system script for retrieving from a web page file the desired system value corresponding to the desired one of the plurality of systems to be tested. The step of selecting a desired one of a plurality of set-system scripts preferably comprises creating a plurality of set-system scripts for writing a respective system value to the web page file hosted on the server, each of the plurality of set-system scripts corresponding to a respective one of the plurality of systems to be tested, and adding the desired one of the plurality of set-system scripts to the beginning of the one or more test script sets selected, such that each of the one or more test script sets selected is executed against the desired one of the plurality of systems to be tested. Moreover, the method comprises repeating both the selecting steps until at least one set from the multiple sets of automated test scripts has been selected for each of the plurality of systems to be tested. Further, the method preferably comprises directing the test script execution manager to execute the one or more test script sets selected against a respective one of the plurality of systems to be tested selected. The directing step preferably comprises executing the desired one of the plurality of set-system scripts for setting the desired system value corresponding to the desired one of the plurality of systems to be tested, executing each of the one or more test script sets selected against the desired one of the plurality of systems to be tested, such that the get-system script is executed each time and before the execution of each individual test script within each of the one or more test script sets selected, and repeating both the executing steps until each of the multiple sets of automated test scripts selected have been executed against the selected plurality of systems to be tested. The step of executing each of the one or more test script sets preferably comprises navigating to the web page file on the server, reading the desired system value from the web page file, and launching an appropriate URL corresponding to the desired system value to execute each of the one or more test script sets selected against the desired one of the systems to be tested.

In yet another embodiment of the invention, there is provided a programmable media containing programmable software to execute a set of automated test scripts against a plurality of systems to be tested, the programmable software comprising the steps of accessing on a server an instance of the set of automated test scripts, writing to a web page file a system value corresponding to a desired one of the plurality of systems to be tested, retrieving the system value from the web page file, and launching a URL using the system value to execute the set of automated test scripts against the desired one of the plurality of systems to be tested. The writing step preferably comprises creating individual set-system scripts for each of the plurality of systems to be tested, adding an initial one of the set-system scripts to the beginning of the set of automated test scripts, and executing the initial one of the set-system scripts to generate the web page file having the system value corresponding to the desired one of the plurality of systems to be tested. The retrieving step preferably comprises creating a get-system script for retrieving from the web page file the system value corresponding to the desired one of the plurality of systems to be tested, and adding the get-system script to the beginning of each one of a plurality of test scripts within the set of automated test scripts, and executing the get-system script to retrieve the system value from the web page file. The launching step preferably comprises converting the system value to the URL, and navigating a browser to the URL to execute the set of automated test scripts. The programmable media software preferably comprises overwriting the web page file to change the system value to a next system value corresponding to a next desired one of the plurality of systems to be tested, retrieving the next system value from the web page file, launching a next URL using the next system value to execute the set of automated test scripts against the next system to be tested, and repeating the overwriting, retrieving and launching steps until the set of automated test scripts have been executed against each of the plurality of systems to be tested. The overwriting step preferably comprises executing another one of the set-system scripts to change the system value to the next system value on the web page file. In a preferred embodiment, the web page file is hosted on the same server as the test scripts.

BRIEF DESCRIPTION OF THE DRAWINGS

The accompanying drawings which are incorporated in and form a part of this specification, illustrate embodiments of the invention and, together with the description, serve to explain the principles of the invention.

FIG. 3 is a table identifying the different scripts that are used for executing test script sets against multiple systems to be tested, in accordance with an embodiment of the invention.

FIG. 6 shows an example of a source code listing for generating a system file having a system value corresponding to a system to be tested, in accordance with an embodiment of the invention.

FIG. 7 shows an example of a source code listing for retrieving a system value from a system file corresponding to a system to be tested, in accordance with an embodiment of the invention.

BEST MODE FOR CARRYING OUT THE INVENTION

Figure 1:
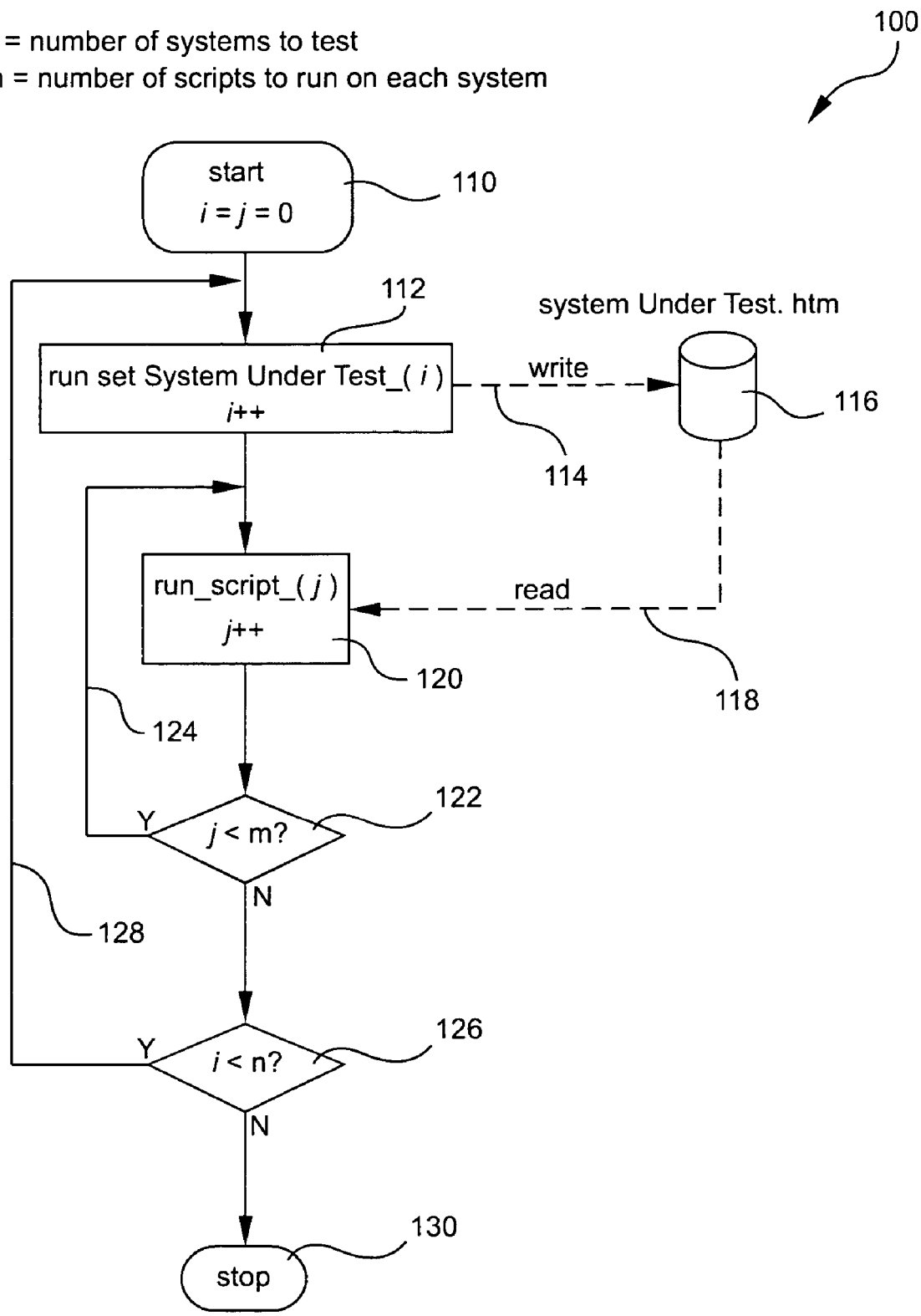
FIG. 1 is a flowchart demonstrating a method of executing a set of test scripts against a plurality of systems to be tested, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method of executing a test set or a test script set (which is made up of a plurality of individual test scripts) for testing software installed on multiple computer systems. The method comprises providing an instance of a test script set on some type of a storage media, such as a disk or hard drive, preferably, a network drive, and more preferably, on a web server. As used herein, a test script set or test set refers to a set of automated and/or regression test scripts that have been created, preferably, using a commercially available test script execution tool or software. Preferably, each of these automated test scripts are grouped in a test script set, where the test script set is designed to achieve a specific testing goal, for example, to test a new version of an application or to test a specific function in an application. When creating a test script set, preferably, a selection is made as to which of the automated test scripts are to be included in that set. However, in a preferred alternative embodiment, instead of a test script set, a plurality of test scripts (one or more test scripts) are executed against multiple systems. In order to direct an instance of a test script set or test scripts to be executed against multiple systems, separate utility scripts called "set-system-under-test" or "set-system" scripts are created for each one of the computer systems to be tested. Each set-system script generates a data file, more preferably, a web page or web page file (also, referred to as system web page file or system-under-test web page file) that has written on it data or more specifically, a "system value" or a "system-under-test value" that corresponds to a computer system to be tested (that is, one system out of the plurality of systems to be tested). In a preferred embodiment, the web page file is a static web page file, however, the web page file created can be a dynamic web page that holds data specifying which system is to be tested. As used herein, the "system value" represents a mnemonic or code that corresponds to a specific computer system. Further, each computer system is represented by a unique Uniform Resource Locator (URL).

In order to run any of the test scripts or test script sets against a particular computer system, a test script first has to navigate to the URL of that computer system. As such, a second utility script or subroutine called "get-system-under-test" or "get-system" script is created for retrieving the system value corresponding to the computer system to be tested, which has been written by the set-system script onto the web page file. In a preferred embodiment, the get-system script is a subroutine that is added to each of the test scripts within a test script set. It is the get-system script that enables retrieval of the system value corresponding to a system to be tested. In particular, the get-system script navigates to the web page file and reads in the data or system value set by the set-system script. In a preferred embodiment, the system value written in the web page file is a mnemonic or code, which is looked up in a table that contains the corresponding URL (Uniform Resource Locator). Preferably, the system value is converted into the corresponding URL, a browser is navigated to that URL, such that, the URL corresponding to the system value is launched and the test script set is executed against that system. Moreover, if the test script set is to be executed against another computer system, then the appropriate set-system script is executed to overwrite the web page file, such that the initial system value is replaced with a new or next system value corresponding to that another computer system. Further, each of the test scripts within the test script set is serially executed, such that the get-system subroutine is executed first to retrieve the new or next system value for launching a next URL corresponding to that another system, followed by the execution of the actual test script. In a preferred embodiment, the set-system scripts are created using a commercially available test script execution engine or tool, more preferably, using the same engine or tool used for creating the test scripts. Also, the get-system script is created, preferably, using a commercially available test script execution engine or tool, more preferably, using the same engine or tool used for creating the test scripts. In a preferred embodiment, the test scripts, the set-system scripts and the get-system script are created using Mercury's QuickTest® Professional test script execution engine or tool.

The process of executing a set of automated test scripts against a plurality of systems is depicted in the flow chart 100 shown in FIG. 1. As shown in FIG. 1, there are n number of systems to be tested and there are m number of test scripts to be run on each of the n systems. The method shown in FIG. 1, includes the creation of a utility script called "setSystemUnderTest_(i)", which writes to a web page file a system value representing a desired or current system under test against which the test scripts are to be executed. The method further includes creating a second utility script or a subroutine called "getSystemUnderTest" (not shown explicitly in FIG. 1), which is added to the beginning of each of the plurality of test scripts m, so that when "run_script_(j) is executed in step 120, the getSystemUnderTest subroutine is executed first before the actual test script. Further, "i" is the index value representing a different system and "j" is the index value representing a different automated test script. As shown in the flowchart in FIG. 1, both the index values for i and j are initially set to 0 in step 110, such that the first test script called is script_0 and the first system tested is system_0. The utility script "setSystemUnderTest_(i)" is executed at the start in step 112 to set or write in step 114 the first desired or current system under test value on the web page file called "systemUnderTest.htm", denoted by numeral 116. At the start of execution of each of the automated test scripts "run_script_(j)" in step 120, first, the subroutine "getSystemUnderTest" appended to the beginning of each of the test scripts is called to retrieve or read the desired or current system under test value in step 118, which has already been set in step 114 on the web page file "systemUnderTest.htm" 116. Preferably, it is only after the system value has been retrieved that the actual script is executed in step 120. Next, as shown in step 122, the index value j is compared to m (the total number of test scripts) to see whether there are any more test scripts that need to be executed against the first system. If j<m, then the test script "run_script_(j) is executed again, as shown by the loop 124, but this time the index value is incremented by one (as depicted by "j++" in step 120), so that the next test script is executed. However, since the subroutine "getSystemUnderTest" is appended to each of the test scripts, the "getSystemUnderTest" script is executed first and the script navigates to the systemUnderTest.htm web page 116 and reads in the system value, step 118, contained on the web page 116 and then the actual script is executed in step 120. Again, in Step 122, the index value j is compared to m (the total number of test scripts) to see whether there are any more test scripts that need to be executed against the first system. As long as j<m, the loop 124 is repeated to include steps 118 through 122. When j is not less than m, the index value for i is compared to n (the total number of systems to be tested) in step 126. If i<n in step 126, then loop 128 is carried out such that, the "setSystemUnderTest_(i)" is executed again, but this time the index value i is incremented by one (as depicted by "i++" in step 112), to overwrite the system value (thus, representing the next system to be tested) in step 114 on the web page systemUnderTest.htm 116 before executing the script in step 120. Again, each of the scripts is executed against the new system, since the new system value written on the web page file 116 is read in step 118 prior to executing each of the test scripts in step 120. The system value is not changed until each of the scripts has been executed against the system set in the web page file. Thus, when j is not less than m, the index value for i is compared to n (the total number of systems to be tested) in step 126, the loop 128 is carried out such that, the "setSystemUnderTest_(i)" is executed again, but this time the index value is incremented by one (as depicted by "i++"), thus, writing in a new system value (representing yet another system to be tested) in step 114 on the web page systemUnderTest.htm 116 before executing each of the test scripts in step 120. This process continues until each of the test scripts m has been executed against each of the n plurality of systems to be tested.

In yet another embodiment of the invention, the invention provides a method of executing multiple sets of automated test scripts against a plurality of systems to be tested, preferably, using a commercially available test script execution manager for executing the multiple sets of automated test scripts. The automated test scripts are created, preferably, using a commercially available test script execution engine or tool and are stored, preferably, on a web server for wider access, more preferably, on the same web server as the test script execution manager, such that, software installed on the plurality of computer systems can be tested without requiring any manual intervention for changing execution of a test script set from a desired computer system to a different or next desired system. A plurality of set-system scripts are created for writing a respective system value to a web page file hosted on the web server, such that each of the plurality of systems has a respective set-system script. The set-system scripts are created, preferably, using a commercially available test script execution engine or tool, more preferably, using the same engine or tool used for creating the test scripts, such as, Mercury's QuickTest® Professional test script execution engine or tool. In a preferred embodiment, the web page file is a static web page file, however, the web page file created can be a dynamic web page that holds data specifying which system is to be tested. Further, a get-system script is appended to the beginning of each of the individual test script within each of the multiple sets of automated test scripts, such that the get-system script is executed first to retrieve from a web page file a desired system value corresponding to a desired one of the plurality of systems to be tested. The get-system script is created, preferably, using a commercially available test script execution engine or tool, more preferably, using the same engine or tool used for creating the test scripts, such as Mercury's QuickTest® Professional test script execution engine or tool. When using a test execution manager, one selects and adds a desired one of a plurality of set-system scripts corresponding to the desired one of the plurality of systems to be tested to an execution sequence and, further, selects and adds one or more test script sets from the multiple sets of automated test scripts to be executed against the desired one of the plurality of systems selected. The selection and addition of another desired system to be tested and the selection and addition of test script sets to be executed are repeated until at least one set from the multiple sets of automated test scripts has been selected for each of the plurality of systems to be tested. The test script execution manager executes the one or more test script sets selected against the selected systems in the order that they are listed within the test script execution manager. In particular, since a set-system script is first selected and added to the execution sequence within the test script execution manager, the set-system script is executed first to set the desired system value corresponding to the desired one of the plurality of systems to be tested. Then each of the one or more test script sets selected and added to the execution sequence is executed against the desired one of the plurality of systems to be tested, until all the desired test script sets added to the execution sequence have been individually executed against the desired system. Further, the get-system script is executed each time and before the execution of each individual test script within each of the one or more test script sets in the execution sequence. In particular, the get-system subroutine or script navigates to the web page file on the server, reads the desired system value from the web page file, and launches an appropriate URL corresponding to the desired system, thus, ensuring that the test script is being executed against the desired system.

Figure 2:
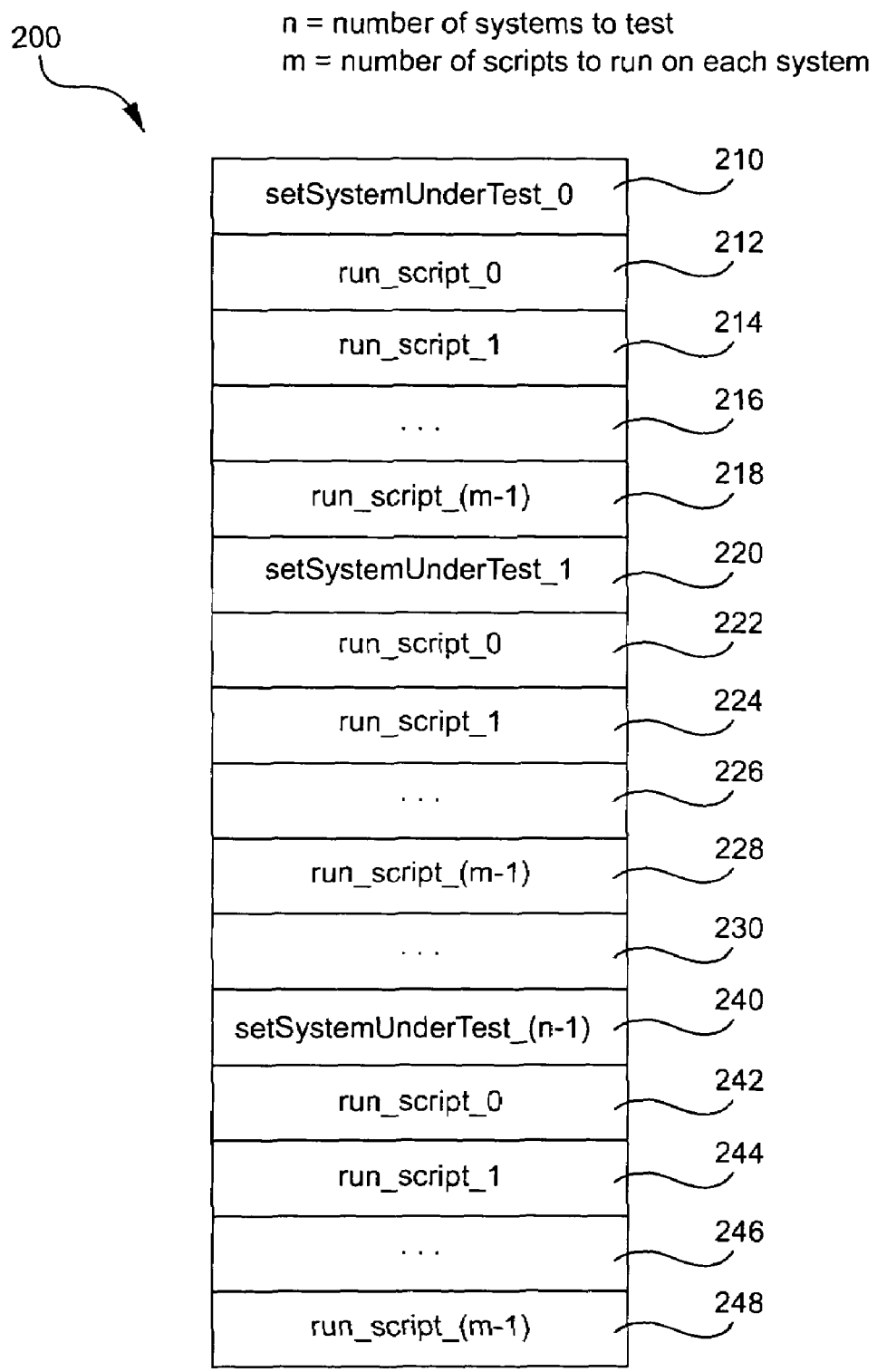
FIG. 2 is a diagram demonstrating an execution sequence of a set of test scripts against a plurality of systems to be tested, in accordance with an embodiment of the invention.

Referring to FIG. 2, numeral 200 depicts a test execution sequence for executing a test script set against a plurality of systems. As shown in FIG. 2, there are n number of systems to be tested and there are m number of test scripts to be run on each of the n systems. A desired one of the set-system utility scripts is first selected or added to a test execution sequence, preferably, to a test execution sequence in a commercially available test script execution manager or tool, so that the execution of the test scripts can be carried out automatically without any manual intervention. Then, one selects or adds a test script set that is to be executed against the system that has been selected. Next, another desired one of the set-system-under-test scripts is selected or added to the test execution sequence. Again, another test script set is added to the test execution sequence. This process is repeated until each of the systems to be tested as well as the test script set to be executed is added to the test execution sequence. The listing in the test execution sequence dictates the order in which the tests will be carried out, that is, which system will be tested first and what test scripts or test script sets will be executed against that system. Accordingly, FIG. 2 depicts a sequential order in which an execution sequence 200 is carried out. The execution sequence 200 is as follows: "setSystemUnderTest_0", "run-script_0", "run_script_1" . . . "run_script_(m-1)", "setSystemUnderTest_1", "run_script_0", "run_script_1" . . . "run_script_(m-1), "setSystemUnderTest_(n-1)", "run_script_0", "run_script_1" . . . "run_script_(m-1), in sequence. In the execution sequence 200, setSystemUnderTest_0 is executed first (in step 210) to set the system value to "System 0", the first system that is going to be tested, and script_0 is executed next (in step 212), followed by the execution of script_1 (in step 214) through (shown by " . . . " in step 216) script_(m-1), in step 218, are all executed in consecutive order against System 0 as set forth in the execution sequence 200. Similarly, the setSystemUnderTest_1 in step 220 signifies that the setSystemUnderTest_1 script is executed next to overwrite the current system value to a new system value, namely, changing the system from System 0 to System 1. Thus, in steps 222 to steps 228, script_0, script_1 through script_(m-1) are all executed in consecutive order against System 1. Furthermore, the " . . . " in step 230 signifies that additional systems and scripts to be executed against those systems can be added to the execution sequence as desired. Finally, the setSystemUnderTest_(n-1) in step 140 signifies that the setSystemUnderTest_(n-1) is executed to overwrite the current system value on the web page file to a new system value corresponding to System (n-1) and that in steps 242 to 148, script_0 through script_m-1 are all going to be executed in consecutive order against System (n-1). Thus, each of the scripts is executed against each of the systems, as selected in the execution sequence 200.

FIG. 3 depicts a table 300 outlining the various scripts and their corresponding function. In table 300, 310 is the "setSystemUnderTest_(i)" utility script that updates the current system under test by replacing the existing systemUnderTest.htm file with HTML code selecting the new system under test value. Given a set of m systems to be tested, this script will execute for i={0, . . . , (m-1)}, where each index value represents a different target test system. Next, 314 is the getSystemUnderTest script or subroutine that navigates to the systemUnderTest.htm web page, reads the value of the current system under test and saves it in a variable called sysUnderTest_value_out. The script uses this value to navigate to the URL of the system to be tested and executes. Given a set of n automated scripts, run_script_(j) will run on each system under test for j={0, . . . , (n-1)}, where each index value represents a different automated script. Similarly, 318 represents the convertSysToURL( ) script, which is a generic algorithm whose input is a mnemonic or some code associated with a system under test and whose output is its corresponding Internet URL. The setBrowserTo( ) 322 is a generic algorithm whose input is an Internet URL and whose output is the act of navigating an Internet browser to that URL. Finally, in 326, run_script_(j) represents the execution of an automated script. Each automated script starts by first executing the subroutine getSystemUnderTest, numeral 314, which retrieves the system value written on the web page file, systemUnderTest.htm. Then, the script convertSysToURL( ), numeral 318, is executed to convert the retrieved system value to a corresponding Internet URL. Finally, the script setBrowserTo( ), numeral 322, is executed to navigate an Internet browser to the corresponding Internet URL so that the script can be executed.

Figure 4:
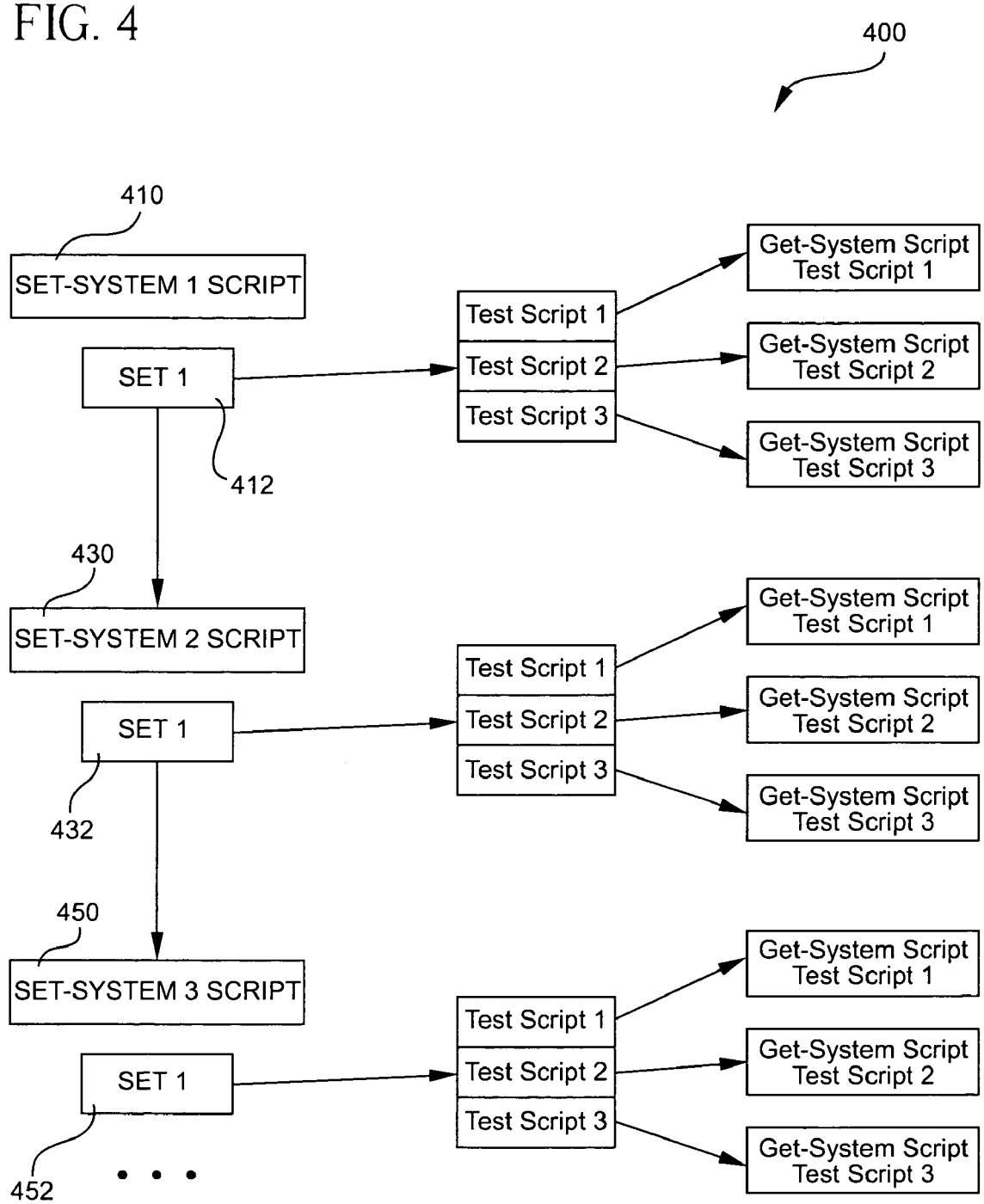
FIG. 4 illustrates a method of executing a set of automated test scripts against a plurality of systems to be tested, in accordance with an embodiment of the invention.

Referring to FIG. 4, FIG. 4 demonstrates an example of an execution sequence 400 for executing a set of automated test scripts (called "Set 1") against three systems to be tested (called "System 1", "System 2" and "System 3", respectively). In particular, a "Set-System" utility script called "Set-System 1 Script" is first added to the execution sequence in step 410 followed by the addition of test script set, "Set 1" in step 412. Then, a "Set-System 2 Script" utility script is added to the execution sequence in step 430 followed by the addition of test script "Set 1" in step 432 and, finally, a utility script "Set-System 3 Script" is added in step 450, followed by the addition of test script "Set 1" in step 452. Also, as shown in FIG. 4, "Set 1" to be executed against each of the three systems 1, 2 and 3, in steps 412, 432 and 452, respectively, is made up of three test scripts, namely, "Test Script 1", "Test Script 2" and "Test Script 3". Furthermore, a utility script or subroutine "Get-System Script" is added to the beginning of each of the test scripts within a test script set. In particular, as shown in FIG. 4, the "Get-System Script" is added to the beginning of each of the three test scripts "Test Script 1", "Test Script 2" and "Test Script 3". The "Set-System 1 Script" is executed first in step 410, such that a web page file is generated (not shown in FIG. 4). The web page file has written in it the system value (or system-under-test value) corresponding to the first system to be tested, namely, System 1. Next, each of the test scripts Test Script 1, Test Script 2 and Test Script 3 within Set 1 is executed in step 412. In particular, when Test Script 1 is executed, the Get-System subroutine appended to the beginning of Test Script 1 is executed first, which means that the Get-System Script (subroutine) navigates a browser, such as, Microsoft's Internet Explorer to the generated web page file and retrieves the system value written on the web page file by the Set-System 1 Script in step 410. The browser reads the system value and launches a URL corresponding to the system value for System 1 so that Test Script 1 is executed against System 1. Next, the test management tool executes the second test script, Test Script 2, such that, again the Get-System subroutine appended to the beginning of Test Script 2 is executed first and reads in the system value corresponding to System 1 from the web page file, thus, directing execution of Test Script 2 against System 1. Similarly, Test Script 3 is executed against System 1, since the system-under-test web page file still has written in it the system value for System 1.

Next, the utility script "Set-System 2 Script" is executed in step 430, which overwrites the system value in the web page file, such that, the system value now corresponds to "System 2". Thus, when Set 1 is executed in step 432, the "Get-System Script" attached to the beginning of "Test Script 1" is executed first, which means that the Get-System script or subroutine navigates to the overwritten web page file and retrieves the system value corresponding to System 2 from the web page file. In particular, the browser reads the system value corresponding to System 2 and launches a URL corresponding to System 2, so that Test Script 1 is executed against System 2. Next, Test Script 2 is executed, such that, again the Get-System Script appended to the beginning of Test Script 2 is executed first, ensuring that Test Script 2 is executed against System 2 as specified by the system value written on the web page file. Similarly, Test Script 3 is executed against System 2. Next, the "Set-System 3 Script" is executed in step 450. The Set-System 3 utility script overwrites the system value on the web page file to now set the system value to that corresponding to System 3. Again, each of the test scripts within Set 1 is executed in step 452, with the Get-System Script being executed first, such that, the Get-System Script navigates the browser to the overwritten web page file and retrieves the overwritten system value corresponding to System 3 from the web page file each time and before the execution of each of the respective Test Scripts 1, 2 and 3. Thus, when Set 1 is executed in step 452, Test Script 1, Test Script 2 and Test Script 3 are all executed against System 3. Accordingly, in this manner, if Set 1 has to be executed against more systems, then one can add additional systems one at a time, each system followed by the addition of Set 1. This process can be repeated until all the additional systems to be tested are listed in the execution sequence, so that the test management tool can carry out the execution of the scripts in a sequential order as explained herein above.

Preferably, both the set-system and get-system scripts are created using a commercially available functional enterprise testing tool, such as Mercury's QuickTest® Professional software, whereas, the execution sequence is carried out using another commercially available test management tool, namely, Mercury's Test Director® software. Moreover, in a preferred embodiment, the system-under-test value corresponds to a URL (Uniform Resource Locator), which is looked up in a table, so that, the URL corresponding to a system to be tested is launched and the test script set is executed against that system. Further, in a preferred embodiment, the web page file that is generated is a web page file that is hosted on a server, more preferably, on the same server as the test script set or sets. Alternatively, the web page file can be stored on a disk, a hard drive of a computer or on a network drive. Further yet, instead of the utility script Set-System writing in a system value or a mnemonic corresponding to a system to be tested on a web page file, the script can be designed to write in the actual URL for a system to be tested, thus, skipping the step of having to look up the corresponding URL for a system value in a table. Moreover, although the invention has been described as creating a static web page file, alternatively, the web page file created can be a dynamic web page that holds data specifying which system is to be tested. In a dynamic web page implementation, preferably, an execution environment, such as PERL [Practical Extraction and Report Language] would be installed on a web server. Accordingly, the Set-System script would no longer need to perform file operations to update the web page file, systemUnderTest.htm. Instead, the Set-System script would navigate to the systemUnderTest.htm web page, select the desired system from a drop-down list of system values, and, preferably, click a "submit" button. Upon clicking "submit", a script on the web server, preferably, written using PERL, would update the web page file, systemUnderTest.htm, to reflect the system value chosen by the Set-System script.

Figure 5:
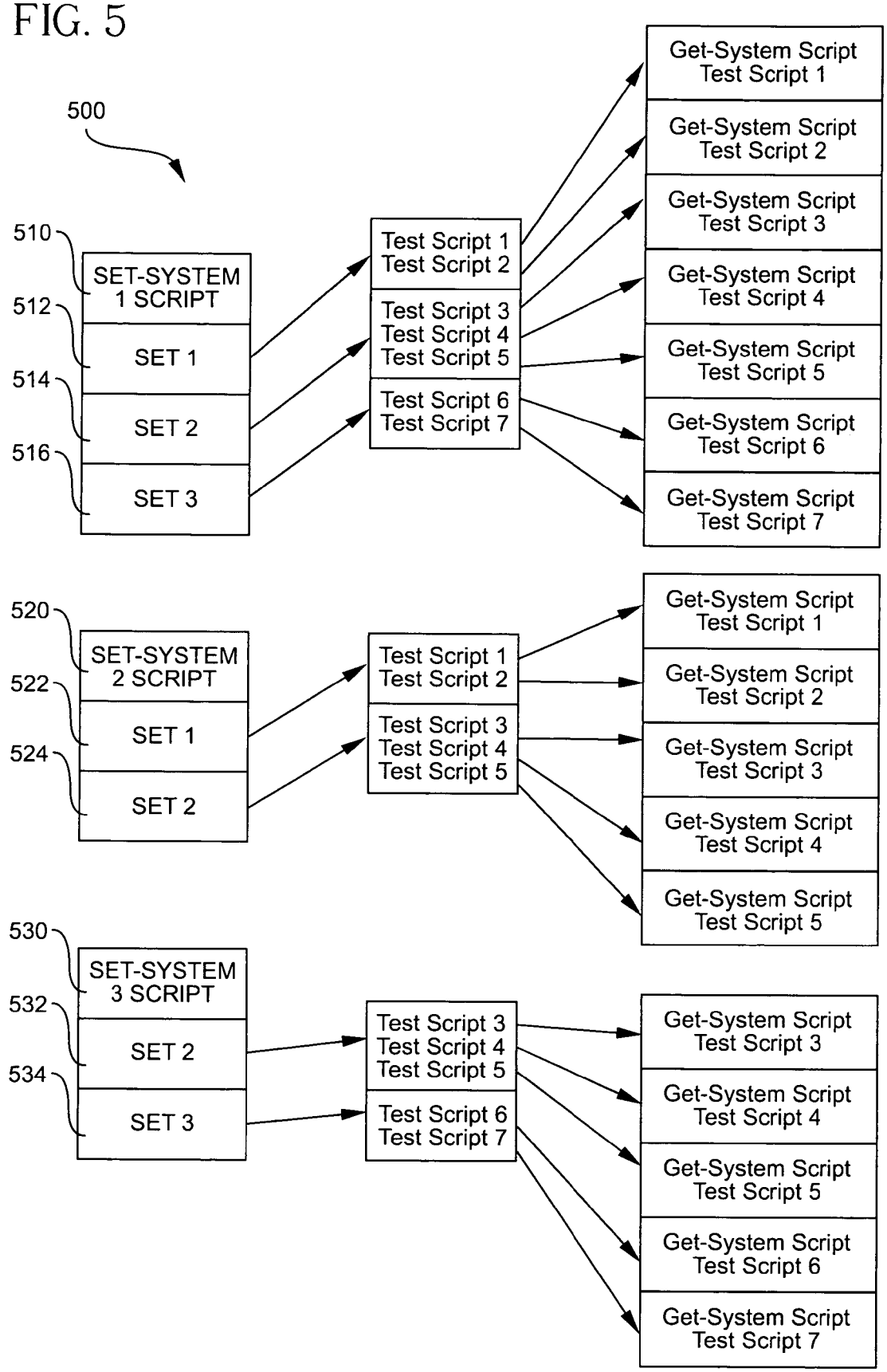
FIG. 5 illustrates a method of executing multiple sets of automated test scripts against a plurality of systems to be tested, in accordance with an embodiment of the invention.

FIG. 5 shows another example of an execution sequence 500, where one or more test script sets are scheduled to be executed against each of three separate computer systems, in accordance with an embodiment of the invention. The three (3) different computer systems to be tested are denoted as "System 1", "System 2" and "System 3". Further, the test scripts chosen to be executed against each of the three systems are chosen from the following three test sets, namely, "Set 1", "Set 2" and "Set 3". In particular, Set 1, Set 2 and Set 3 are all chosen to be executed against System 1 (as shown in steps 512, 514 and 516), whereas, only Set 1 and Set 2 are selected to be executed against System 2 (as shown in steps 522 and 524), and, finally, test script sets, Set 2 and Set 3 (as shown in steps 532 and 534) are selected to be executed against System 3. Also, there are three separate utility scripts that are created to correspond to each of the three systems to be tested. In particular, "Set-System 1 Script" corresponds to System 1, "Set-System 2 Script" corresponds to System 2, and "Set-System 3 Script" corresponds to System 3. In order to execute one or more of the three test script sets against each of the three systems, a user has to set forth an execution sequence, that is, the sequential order in which the scripts will be executed, preferably, using a commercially available testing tool. In the example, "Set-System 1 Script" is first selected to be added to the execution sequence in 510. Then, the test script set "Set 1" is added to the execution sequence in 512, followed by "Set 2" in step 514 and "Set 3" in step 516, respectively. Similarly, "Set-System 2 Script" is then selected to be added to the execution sequence in step 520. Then, the test script sets "Set 1" and "Set 2" in steps 522 and 524, are all added, respectively. Finally, "Set-System 3 Script" is selected to be added to the execution sequence in step 530. Then, the test script sets "Set 2" and "Set 3" are all added, in steps 532 and 534, respectively. As shown in FIG. 5, "Set 1" is made up of "Test Script 1" and Test Script 2", "Set 2" is made up of "Test Script 3", "Test Script 4" and "Test Script 5", whereas, "Set 3" is made up of "Test Script 6" and "Test Script 7". As previously explained, the grouping of the test scripts within a test script set can be customized in any number of ways and in accordance with one or more testing objectives.

Furthermore, as shown in FIG. 5, a subroutine or utility script called "Get-System" is added to the beginning of each of the test scripts within each test set, that is, the Get-System subroutine is added to the beginning of each of the Test Scripts 1 through 7. Accordingly, during the execution sequence carried out for the example in FIG. 5, the scripts are executed in order, as follows: Set-System 1 Script, Get-System Script, Test Script 1, Get-System Script, Test Script 2, Get-System Script, Test Script 3, Get-System Script, Test Script 4, Get-System Script, Test Script 5, Get-System Script, Test Script 6, Get-System Script, Test Script 7, Set-System 2 Script, Get-System Script, Test Script 1, Get-System Script, Test Script 2, Get-System Script, Test Script 3, Get-System Script, Test Script 4, Get-System Script, Test Script 5, Set-System 3 Script, Get-System Script, Test Script 3, Get-System Script, Test Script 4, Get-System Script, Test Script 5, Get-System Script, Test Script 6, Get-System Script, and Test Script 7. Thus, each test script is independent and contains the subroutine Get-System, which gets the system value from the web page for its own use and runs against the URL corresponding to the system it finds on the web page. In this manner, if one wants to execute test script sets against additional systems, the additional systems can be added to the execution sequence as outlined above, so that manual intervention is not required to execute test sets against multiple systems.

FIG. 6 provides an example of a source code for the "Set-System" or "SetSystemUnderTest" utility script. The set-system utility first prepares an HTML file for writing, then writes to the HTML file and closes the HTML file. As shown in FIG. 6, the set-system script writes in a system value corresponding to the first system to be tested, namely, System 1. However, the system value can be changed from System 1 to any one of the other three systems, namely, System 2, System 3 or System 4. As shown in FIG. 6, the set-system script chooses a system by adding the word "selected" to the HTML <option> tag associated with the first system to be tested, namely, System 1. The tag then reads: "<option selected>System 1</option>. Similarly, the system value can be changed from System 1 to any one of the other three systems, namely, System 2, System 3 or System 4 by removing the word "selected" from the <option> tag associated with System 1 and adding it to the <option> tag associated with any one of the other three systems.

FIG. 7 provides an example of a source code for the utility script or subroutine "Get-System" or "GetSystemUnderTest". As shown, the system value corresponding to a system to be tested is stored in a variable called "sysUnderTest_value_out", which is the value that is returned to the calling automated test script. This value is then used to navigate the browser to the correct URL and to run the automated test script against the URL of the system to be tested.

Furthermore, in yet another embodiment, the invention provides a system that comprises a computer terminal or an equivalent device, a computer readable storage media or programmable media containing programmable software to execute one or more test script sets against multiple or a plurality of systems in a form that is executable by a computer system. The programmable software comprises the steps of accessing on a server an instance of a set of automated test scripts, writing to a web page file or web page file a system value corresponding to a desired one of the plurality of systems to be tested, the web page file being hosted, preferably, on the same server as the set of test scripts. The writing further comprises creating individual set-system scripts for each of the plurality of systems to be tested, adding an initial one of the set-system scripts to the beginning of the set of automated test scripts, and executing the initial one of the set-system scripts to generate the web page file having written on it the system value corresponding to the desired one of the plurality of systems to be tested. The programmable software further comprises retrieving the system value from the web page file. The retrieval comprises creating a get-system script for retrieving from the web page file the system value corresponding to the desired one of the plurality of systems to be tested, adding the get-system script to the beginning of each one of a plurality of test scripts within the set of automated test scripts and executing the get-system script to retrieve the system value from the web page file. The software further comprises launching a URL using the system value to execute the set of automated test scripts against the desired one of the plurality of systems to be tested. The launching further comprises converting the system value to the URL and navigating a browser to the URL to execute the set of automated test scripts. Moreover, to execute the set of automated test scripts against the plurality of systems, the programmable software comprises overwriting the web page file to change the system value to a next system value corresponding to a next desired one of the plurality of systems to be tested by executing another one of the set-system scripts to change the system value to the next system value on the web page file. The software includes retrieving the next system value from the web page file and launching a next URL using the next system value to execute the set of automated test scripts against the next system to be tested. The steps of overwriting the web page file to set a new system value, retrieving that new system value and launching an appropriate URL corresponding to that new system value are repeated until the set of automated test scripts have been executed against each of the plurality of systems to be tested. After an automated test script set has been executed, the software provides a pass/fail execution report that can be analyzed by a software professional. Furthermore, the pass/fail results or report of the automated tests may be displayed on a visual display such as a computer monitor screen, printed out or stored in a memory either internal to the terminal or on a disc for later use.

In a preferred embodiment, a software professional or user uses a computer terminal or an equivalent device for accessing the one or more sets of automated test scripts stored, preferably, on a server or alternatively, stored in a memory either internal to the computer terminal or external to the computer terminal. Similarly, the tests may be performed either on the same computer terminal or on a web server linked to an electronic network, or on a client PC linked to an electronic network. Further, in a preferred embodiment, the test scripts are created using Mercury's QuickTest® Professional test script execution engine or tool, whereas, the execution of the test scripts on the various systems are carried out by means of a commercially available test script execution manager or management tool, such as, Mercury's TestDirctor® software program. Preferably, the TestDirectore® software is installed on an organization's web server, along with the automated test scripts created using Mercury's QuickTest® Professional software. Moreover, preferably, the web page file is hosted on the same server as the TestDirector® software. Mercury's QuickTest® Professional software is installed on individual computer systems or workstations, such that, different individuals that are part of a software testing team can create one or more test scripts for testing a specific aspect or all aspects of an application or web site. Further, these tests can be run every time a web site or application changes. Additionally, after a test script set has been executed against one or more systems, Mercury's TestDirector® software provides an online pass/fail execution report that can be analyzed by software professionals within the organization.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of executing a set of automated test scripts against a plurality of systems to be tested, said method comprising the steps of:
   (a) providing an instance of said set of automated test scripts on a server;
   (b) writing to a system-under-test web page file hosted on said server an initial system-under-test value corresponding to an initial system to be tested;
   (c) retrieving said initial system-under-test value from said system-under-test web page file;
   (d) launching an initial URL using said initial system-under-test value retrieved to execute said set of automated test scripts against said initial system to be tested;
   (e) overwriting, upon completion of execution of said set of automated test scripts against said initial system, said system-under-test web page file to change said initial system-under-test value to a next system-under-test value corresponding to a next system to be tested;
   (f) retrieving said next system-under-test value from said system-under-test web page file;
   (g) launching a next URL using said next system-under-test value to execute said set of automated test scripts against said next system to be tested; and
   (h) repeating steps (e) through (g) until said set of automated test scripts have been executed against each of said plurality of systems to be tested.

2. The method according to claim 1, wherein said writing further comprises:
   creating a set-system-under-test script for each of said plurality of systems; and
   executing an initial one of said set-system-under-test script created to generate said system-under-test web page file having said initial system-under-test value.

3. The method according to claim 1, wherein said retrieving further comprises:
   creating a get-system-under-test script for navigating to said system-under-test web page file on said server;
   adding said get-system script to the beginning of each one of a plurality of test scripts within said set of automated test scripts; and
   executing said get-system-under-test script to retrieve said initial system-under-test value from said system-under-test web page file.

4. The method according to claim 1, wherein said launching further comprises:
   converting said initial system-under-test value to said initial URL; and
   navigating a browser to said initial URL to execute said set of automated test scripts.

5. The method according to claim 1, wherein said set of automated test scripts are created using a test script execution engine.

6. The method according to claim 1, wherein said set of automated test scripts are executed using a test script execution manager.

7. The method according to claim 2, wherein said overwriting further comprises:
   executing another one of said set-system-under-test script created to change said initial system-under-test value to said next system-under-test value on said web page file.

8. A method of executing multiple sets of automated test scripts against a plurality of systems to be tested, said method comprising the steps of:
   (a) providing a test script execution manager for executing said multiple sets of automated test scripts;
   (b) providing an instance of said multiple sets of automated test scripts on a server;
   (c) appending a get-system script to the beginning of each individual test script within each of said multiple sets of automated test scripts for retrieving a desired system value corresponding to a desired one of said plurality of systems to be tested;
   (d) selecting a desired one of a plurality of set-system scripts corresponding to said desired one of said plurality of systems to be tested;
   (e) selecting one or more test script sets from said multiple sets of automated test scripts to be executed against said desired one of said plurality of systems selected;
   (f) repeating steps (d) and (e) until at least one set from said multiple sets of automated test scripts has been selected for each of said plurality of systems to be tested;
   (g) executing said desired one of said plurality of set-system scripts for setting said desired system value corresponding to said desired one of said plurality of systems to be tested;
   (h) executing each of said one or more test script sets selected against said desired one of said plurality of systems to be tested, such that said get-system script is executed each time and before the execution of each individual test script within each of said one or more test script sets selected; and
   (i) repeating steps (g) and (h) until each of said multiple sets of automated test scripts selected have been executed against said plurality of systems to be tested selected.

9. The method according to claim 8, wherein said appending further comprises:
   creating a get-system script for retrieving from a web page file said desired system value corresponding to said desired one of said plurality of systems to be tested.

10. The method according to claim 8, wherein said selecting a desired one of a plurality of set-system scripts further comprises:
    creating a plurality of set-system scripts for writing a respective system value to said web page file hosted on said server, each of said plurality of set-system scripts corresponding to a respective one of said plurality of systems to be tested; and
    adding said desired one of said plurality of set-system scripts to the beginning of said one or more test script sets selected, such that each of said one or more test script sets selected is executed against said desired one of said plurality of systems to be tested.

11. The method according to claim 9, wherein said executing each of said one or more test script sets further comprises:
    navigating to said web page file on said server;
    reading said desired system value from said web page file; and
    launching an appropriate URL corresponding to said desired system value to execute each of said one or more test script sets selected against said desired one of said systems to be tested.

12. A computer readable storage medium having program instructions to execute a set of automated test scripts against a plurality of systems to be tested, said program instructions performing the steps of:
(a) accessing on a server an instance of said set of automated test scripts;
(b) writing to a web page file a system value corresponding to a desired one of said plurality of systems to be tested, said web page file being hosted on said server;
(c) retrieving said system value from said web page file;
(d) launching a URL using said system value to execute said set of automated test scripts against said desired one of said plurality of systems to be tested;
(e) overwriting said web page file to change said system value to a next system value corresponding to a next desired one of said plurality of systems to be tested;
(f) retrieving said next system value from said web page file;
(g) launching a next URL using said next system value to execute said set of automated test scripts against said next system to be tested; and
(h) repeating steps (e) through (g) until said set of automated test scripts have been executed against each of said plurality of systems to be tested.

13. A computer readable storage medium according to claim 12, wherein said writing further comprises:
creating individual set-system scripts for each of said plurality of systems to be tested;
adding an initial one of said set-system scripts to the beginning of said set of automated test scripts; and
executing said initial one of said set-system scripts to generate said web page file having said system value corresponding to said desired one of said plurality of systems to be tested.

14. A computer readable storage medium according to claim 12, wherein said retrieving further comprises:
creating a get-system script for retrieving from said web page file said system value corresponding to said desired one of said plurality of systems to be tested; and
adding said get-system script to the beginning of each one of a plurality of test scripts within said set of automated test scripts; and
executing said get-system script to retrieve said system value from said web page file.

15. A computer readable storage medium according to claim 12, wherein said launching further comprises:
converting said system value to said URL; and
navigating a browser to said URL to execute said set of automated test scripts.

16. A computer readable storage medium according to claim 13, further comprising:
executing another one of said set-system scripts to change said system value to said next system value on said web page file for overwriting said web page file.

* * * * *